(12) United States Patent
Martin et al.

(10) Patent No.: US 9,747,543 B1
(45) Date of Patent: Aug. 29, 2017

(54) SYSTEM AND METHOD FOR CONTROLLER ADAPTATION

(71) Applicant: HRL Laboratories, LLC, Malibu, CA (US)

(72) Inventors: Charles E. Martin, Thousand Oaks, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1 day.

(21) Appl. No.: 14/869,961

(22) Filed: Sep. 29, 2015

Related U.S. Application Data

(60) Provisional application No. 62/057,633, filed on Sep. 30, 2014.

(51) Int. Cl.
*G06N 3/02* (2006.01)
*G06N 3/04* (2006.01)
(Continued)

(52) U.S. Cl.
CPC .......... *G06N 3/04* (2013.01); *G05B 19/4155* (2013.01); *G06N 3/10* (2013.01); *G05B 2219/41054* (2013.01); *G06N 3/02* (2013.01)

(58) Field of Classification Search
None
See application file for complete search history.

(56) References Cited

U.S. PATENT DOCUMENTS

2007/0055392 A1   3/2007   Amato et al.
2007/0239310 A1  10/2007   Fan
(Continued)

FOREIGN PATENT DOCUMENTS

JP       2012-230701       11/2012

OTHER PUBLICATIONS

Martin, et al., Fast re-learning of a controller from sparse data, Conference Proceedings—IEEE International Conference on Systems, Man and Cybernetics. 2014: 973-978.*

(Continued)

*Primary Examiner* — Wilbert L Starks
(74) *Attorney, Agent, or Firm* — Tope-McKay & Associates

(57) ABSTRACT

A neural-Model Predictive Control (MPC) controller is described to control a dynamical system (i.e., "plant"). The MPC controller receives, in a base controller, a measurement of a current state of a plant and generates a control signal based on the measurement of the current state of the plant. A forward module receives the measurement of the current state of the plant and the control signal to generate a forward module prediction. A forward module corrector receives the measurement of the current state of the plant and the control signal from the base controller to generate an additive correction to the forward module prediction to generate a predicted plant state. Control sequences of length L of pairs of control signals and corresponding predicted plant states are generated until $N_s$ control sequences have been generated. A next plant control signal is generated based on the $N_s$ control sequences.

30 Claims, 13 Drawing Sheets

(51) Int. Cl.
 G06N 3/10 (2006.01)
 G05B 19/4155 (2006.01)

(56) References Cited

U.S. PATENT DOCUMENTS

2010/0138004 A1 6/2010 Chia et al.
2011/0125293 A1 5/2011 Havlena

OTHER PUBLICATIONS

Reznik, Fuzzy Controllers, Newnes, Reed Educational and Professional Publishing Ltd., 1997, pp. 1-307.*
International Search Report of the International Searching Authority for PCT/US2015/053117; date of mailing Feb. 3, 2016.
The Written Opinion of the International Searching Authority for PCT/US2015/053117; date of mailing Feb. 3, 2016.
"Google's Self-Driving Cars: 300,000 Miles Logged, Not a Single Accident Under Computer Control". The Atlantic. Retrieved Aug. 10, 2012.
"Google Cars Drive Themselves, in Traffic". New York Times, Oct. 10, 2010.
Christopher Urmson, et al., "Autonomous dnving in urban environments: Boss and the Urban Challenge," Journal of Field Robotics Special Issue on the 2007 DARPA Urban Challenge, Part I, vol. 25, No. 8, Jun. 2008. pp. 425-466.
Masahiko Haruno, Daniel M. Wolpert, Mitsuo Kawato. MOSAIC Model for Sensorimotor Learning and Control. Neural Computation 13, 2201-2220 (2001).
J Bongard, V Zykov, H Lipson, "Resilient Machines Through Continuous Self-Modeling," Science 314 (5802), Nov. 17, 2006, pp. 1118-1121.
Drucker, H., Burges, C.J., Kaufman, L., Smola, A., and Vapnik, V.N., "Support Vector Regression Machines," in Advances in Neural information Processing Systems 9, NIPS 1996, 155-161, MIT Press, 1997.
Scheal, Stefan, and Christopher G. Atkeson. "Constructive incremental learning from only local information." Neural Computation 10(8), pp. 2047-2084, 1998.
Martin, C.E. and Hoffmann, H., "Fast Re-learning of a Controller from Sparse Data," IEEE international Conference on Systems, Man, and Cybernetics, 2014, pp. 973-978.
Sylvain Koos, Antoine Cully and Jean-Baptiste Mouret, "Fast Damage Recovery in Robotics with the T-Resilience Algorithm," arXiv:1302.0386v1, Feb. 2013.
Rawlings, J. B., E. S. Meadows, and K. R. Muske. "Nonlinear model predictive control: A tutorial and survey," Advanced Control of Chemical Processes (1994): pp. 203-214.

A tutorial on support vector regression, Alex J. Smola and Bernhard SCHoelkopf, Statistics and Computing 14: pp. 199-222. 2004, http://alex.smola.org/papers/2004/SmoSch04.pdf.
Ramussen, C. E. (2004). "Gaussian Processes in Machine Learning". Advanced Lectures on Machine Learning Lecture Notes in Computer Science 3176. pp. 63-71.
Pearson, K. (1901). "On Lines and Planes of Ctosest Fit to Systems of Points in Space" (PDF). Philosophical Magazine 2 (11): pp. 559-572. http://stat.smmu.edu.cn/history/pearson1901.pdf.
Oja E. A simplified neuron model as a principal component analyzer. Journal of Mathematical Biology 15(3): pp. 267-273, 1982.
Ouyang S, Bao Z, Liao GS. Robust recursive least squares learning algorithm for principal component analysis. IEEE Transaction on Neural Networks 11(1): pp. 215-221, 2000.
Hoffmann, H., Schaal, S., and Vijayakumar, S. Local dimensionality reduction for non-parametric regression. Neural Processing Letters. vol. 29, pp. 109-131, 2009.
Elizorido E, Birkenhead R, Gongora M, et al. Analysis and test of efficient methods for building recursive deterministic perceptron neural networks. Neural Networks, vol. 20, pp. 1095-1108, 2007.
Fahlman, S and Lebiere, C. The caseade-correlation learning architecture. In Adv. in Neural Info. Processing Systems II, pp. 524-532. San Francisco, CA: Morgan Kaufmann, 1990.
Frean, M. The upstart algorithm: A method for constructing and training feedforward neural networks. Neural Computation, 2, pp. 198-209, 1990.
Islam M, Sattar A, Amin F, Yao X, and Murase K. A New Adaptive Merging and Growing Algorithm for Designing Artificial Neural Networks. IEEE Transactions on Systems, Man, and Cybernetics, Part B: Cybernetics, vol. 39, pp. 705-722, 2009.
Martin, C. E. Adapting Swarm Intelligence for The Self-Assembly and Optimization of Networks (Dissertation). College Park, MD: University of Maryland. 2011, pp. 1-218.
Gruau, F., Whitley, D., and Pyeatt, L. A comparison between cellular encoding and direct encoding for genetic neural networks. In \emph(Proceedings of the 1st annual conference on genetic programming (GECCO '96)} pp. 81-89, Cambridge, MA: MIT Press. 1996.
Jiang, F., Berry, H. and Schoenauer, M. Supervised and evolutionary learning of echo state networks. \emph(Lecture Notes in Computer Science (including subseries Lecture Notes in Artificial Intelligence and Lecture Notes in Bioinformatics)} , 5199, pp. 215-224, 2008.
Wieland, A. Evolving neural network controllers for unstable systems. In \emph{Proceedings of the international joint conference on neural networks (IJCNN '91)}, vol. 2, pp. 667-673, New York: IEEE. 1991.
Martin, C.E. and Hoffmann, H., "Fast Re-learning of a Controller from Sparse Data," IEEE International Conference on Systems, Man, and Cybernetics, Oct. 5, 2014, pp. 973-978.
International Preliminary Report on Patentability for PCT/US2015/053117; date of mailing Apr. 13, 2017.

* cited by examiner

302

Physics-based model of cart-pole system

Forward Module

$$\ddot{x} = \frac{F_c - \mu_c \operatorname{sgn}(\dot{x}) + \sum_{i=1}^{N} \tilde{F}_i}{m_c + \sum_{i=1}^{N} \tilde{m}_i},$$

$$\ddot{\theta} = -\frac{3}{4l_i}\left(\ddot{x}\cos\theta_i + g\sin\theta_i + \frac{\mu_i \dot{\theta}_i}{m_i l_i}\right),$$

$$\tilde{F}_i = m_i l_i \dot{\theta}_i^2 \sin\theta_i + \frac{3}{4} m_i \cos\theta_i \left(\frac{\mu_i \dot{\theta}_i}{m_i l_i} + g\sin\theta_i\right),$$

$$\tilde{m}_i = m_i \left(1 - \frac{3}{4}\cos^2\theta_i\right),$$

FIG. 6

SYSTEM AND METHOD FOR CONTROLLER ADAPTATION

CROSS-REFERENCE TO RELATED APPLICATIONS

This is a non-provisional patent application of U.S. Provisional Application No. 62/057,633, filed on Sep. 30, 2014, the entirety of which is hereby incorporated by reference.

BACKGROUND OF INVENTION (1) Field of Invention

The present invention relates to a controller adaptation system and, more specifically, to a controller adapter that gives a controller of a system (such as an autonomous and/or user controlled automobile or aircraft) the ability to quickly adapt to changes in the system's dynamics.

(2) Description of Related Art

Dynamic systems are typically operated via a controller. The controller is tasked with assessing operating parameters (such as the surrounding environment, etc.) and executing commands on the autonomous system to perform tasks and operate within the confines of the operating parameters.

Several systems and methods have been developed for controlling autonomous systems. For example, model-predictive control (see The List of Incorporated Literature References, Reference No. 1) computes optimal control commands to achieve a given control objective (e.g., keeping a car in the lane), but this computation relies on a forward model of the system dynamics and adapting this model to a sudden change requires another method.

Machine learning methods like support vector regression (see Literature Reference No. 2), Gaussian processes (see Literature Reference No. 3), and principal component analysis (see Literature Reference No. 4) typically require a lot of data to relearn a functional relationship. On-line learning methods gradually adapt an internal model with every single data point (see Literature Reference Nos. 5-7) but cannot adapt to a sudden change. The expected change in the system dynamics may be large, particularly, after damage. Due to such changes, on-line learning models are typically not sufficiently fast at adapting to sudden changes.

Thus, a continuing need exists for a fast controller adaptor that provides adaptation from sparse data due to sudden changes in system dynamics.

SUMMARY OF INVENTION

Described is a neural-Model Predictive Control (MPC) controller for adaptation from sparse data to control a dynamical system despite unexpected changes in the dynamics. A system might be an autonomous and/or user controlled car or aircraft or subcomponent thereof (or any other autonomous system). In other words, in some embodiments, the autonomous system is a plant that is operable for performing a variety of tasks, such as flying (in the event of an aircraft), or driving (in the event of a car), or grasping (in the event of a robot), or any other suitable system operable for performing tasks.

The MPC controller includes one or more non-transitory electronic processors configured to perform several operations (e.g., one or more processors and a memory, the memory being a non-transitory computer-readable medium having executable instructions encoded thereon, such that upon execution of the instructions, the one or more processors perform several operations). As noted above, the one or more non-transitory electronic processors are configured to perform several operations, including: receiving, in a base controller, a measurement of a current state of a plant and generating a control signal based on the measurement of the current state of the plant; receiving, in a forward module, the measurement of the current state of the plant and the control signal to generate a forward module prediction; receiving, in a forward module corrector, the measurement of the current state of the plant and the control signal from the base controller to generate an additive correction to the forward module prediction to generate a predicted plant state; generating control sequences of length L of pairs of control signals and corresponding predicted plant states until $N_s$ control sequences have been generated; and generating a next plant control signal based on the $N_s$ control sequences.

In another aspect, the MPC controller causes the plant to actuate or execute the next control signal.

In yet another aspect, a cost function is defined over predicted plant states, such that the next control plant signal is determined by finding a predicted plant state that minimizes the cost function among the predicted plant states in each of the $N_s$ control sequences to generate a minimizing sequence, and then selecting a first plant control signal from the minimizing sequence. The base controller that generates the minimizing sequence is the base controller that is used on a next time-step.

In yet another aspect, one more sensors are communicatively connected with base controller, forward module, and forward module corrector to generate the measurement of the current state of the plant.

In yet another aspect, each control sequence is generated using a unique randomly generated base controller.

Additionally, the forward module corrector is a neural network.

In another aspect, the forward module corrector is a multi-layer perceptron.

In yet another aspect, the base controller is a neural network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is an illustration depicting example differential equations as employed by a forward module in the cart-pole system;

DETAILED DESCRIPTION

Figure 1:
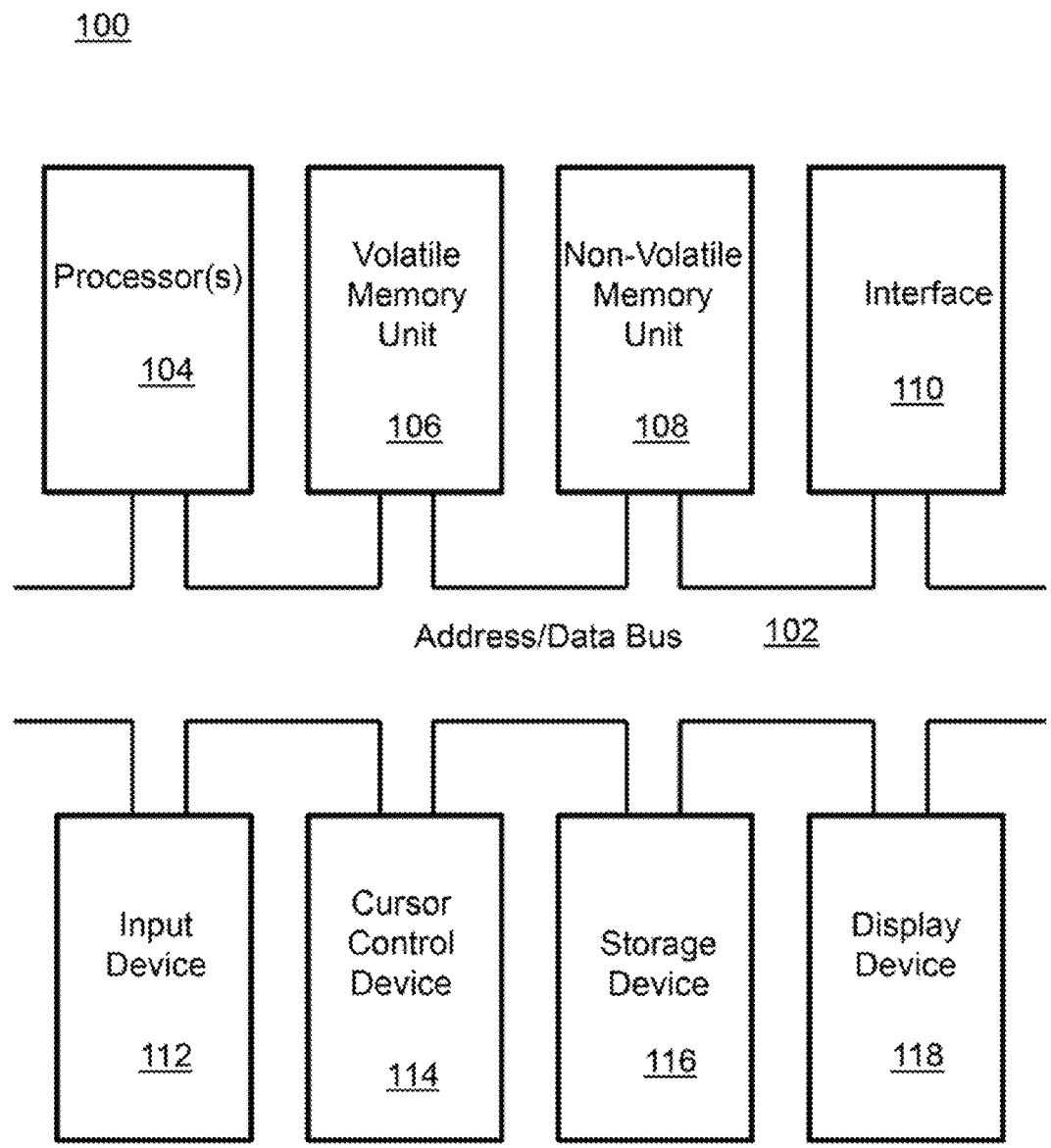
FIG. 1 is a block diagram depicting the components of a system according to some embodiments of the present invention.

The present invention relates to a controller adaptation system and, more specifically, to a controller adapter that allows a controller of a system (such as an autonomous and/or user controlled automobile or aircraft) the ability to quickly adapt to changes in the autonomous system's dynamics. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Allgower Z. Nonlinear model predictive control. Progress in Systems Theory 26. Birkhauser, 2000.
2. Vapnik V N. The nature of statistical learning theory. Springer-Verlag, New York, 1995.
3. Rasmussen C E, Williams C K I. Gaussian Processes for Machine Learning. MIT Press, 2006.
4. Diamantaras K I, Kung S Y. Principal Component Neural Networks. John Wiley & Sons, New York, 1996.
5. Oja E. A simplified neuron model as a principal component analyzer. Journal of Mathematical Biology 15(3): 267-273, 1982.
6. Ouyang S, Bao Z, Liao G S. Robust recursive least squares learning algorithm for principal component analysis. IEEE Transactions on Neural Networks 11(1): 215-221, 2000.
7. Hoffmann, H., Schaal, S., and Vijayakumar, S. Local dimensionality reduction for non-parametric regression. Neural Processing Letters, Vol. 29, pp. 109-131, 2009.
8. Elizondo E, Birkenhead R, Gongora M, et al. Analysis and test of efficient methods for building recursive deterministic perceptron neural networks. Neural Networks, Vol. 20, pp. 1095-1108, 2007.
9. Fahlman, S and Lebiere, C. The cascade-correlation learning architecture. In Adv. in Neural Info. Processing Systems II, pp. 524-532. San Francisco, Calif.: Morgan Kaufmann, 1990.
10. Frean, M. The upstart algorithm: A method for constructing and training feedforward neural networks. Neural Computation, 2, 198-209, 1990.
11. Islam M, Sattar A, Amin F, Yao X, and Murase K. A New Adaptive Merging and Growing Algorithm for Designing Artificial Neural Networks. IEEE Transactions on Systems, Man, and Cybernetics, Part B: Cybernetics, Vol. 39, pp. 705-722, 2009.
12. Martin, C. E. Adapting Swarm intelligence For The Self-Assembly And Optimization Of Networks (Dissertation). College Park, Md.: University of Maryland. 2011.
13. Gruau, F., Whitley, D., and Pyeatt, L. A comparison between cellular encoding and direct encoding for genetic neural networks. In \emph (Proceedings of the 1st annual conference on genetic programming (GECCO '96)) (pp. 81-89). Cambridge, Mass.: MIT Press. 1996.
14. Jiang, F., Berry, H. and Schoenauer, M. Supervised and evolutionary learning of echo state networks. \emph {Lecture Notes in Computer Science (including subseries Lecture Notes in Artificial Intelligence and Lecture Notes in Bioinformatics)}, 5199, 215-224, 2008.
15. Wieland, A. Evolving neural network controllers for unstable systems. In \emph (Proceedings of the international joint conference on neural networks (IUCNN '91)), vol. 2, (pp. 667-673). New York: IEEE. 1991.

(2) Principal Aspects

The present invention has three "principal" aspects. The first is an adaptive-control system (referred to as the "neural-Model Predictive Control (MPC) controller") to control a dynamical system despite unexpected changes in the dynamics. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The method implements the algorithm or process into a programming language and performs the listed operations. The third principal aspect is a computer program product (e.g., a compilation or direct implementation of the logic from the method into a form that is suitable to be executed on selected hardware). The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of some embodiments is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

For example, generally speaking, the system can be implemented as one or more non-transitory electronic processors that are configured to perform the listed operations. One example of such non-transitory electronic processors is a computer processor(s) and a memory having executable instructions encoded thereon to perform the listed operations. As other examples, the non-transitory electronic processors can be hardware-based (physical) neural networks, or neural networks implemented in special purpose processing hardware, such as a graphics processor unit (GPU) or field programmable gate array (FPGA).

Figure 2:
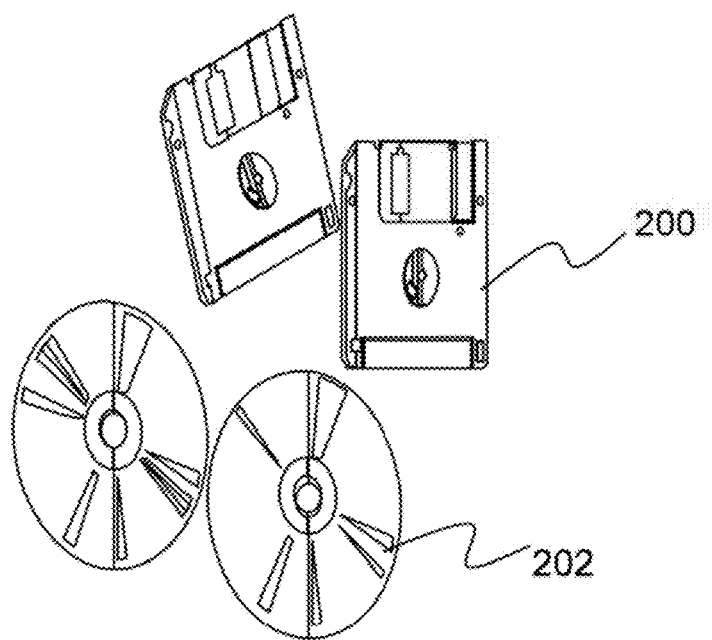
FIG. 2 is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a controller adapter (referred to herein as the "neural-Model Predictive Control (MPC) controller") to control a dynamical system despite unexpected changes in the dynamics. A system might be an autonomous and/or user controlled car or aircraft or subcomponent thereof (or any other autonomous system). In other words, the autonomous and/or user controllable system is a plant that is operable for performing a variety of tasks, such as flying (in the event of an aircraft), or driving (in the event of a car), or grasping (in the event of a robot). A controller is software and relevant hardware that monitors the behavior of the plant and calculates control commands affecting the behavior of the plant. Here, the unexpected change is not normal plant behavior. Normal plant behavior is, for example, behavior that is expected and could be preprogrammed into the controller. Instead, this disclosure is directed to changes to the plant due to failure or an unexpected change in the surroundings of the plant (e.g., a slippery patch of road). A unique aspect of some embodiments is that the neural-MPC controller uses a neural network with only a few hidden neurons in parallel to a forward module of the system dynamics and integrates both within a model-predictive control framework. An advantage of the neural-MPC controller is that it enables an autonomous system (i.e., plant) to quickly adapt to changes in the system dynamics. These changes could be caused by, for example, unexpected failure, etc. For some embodiments, the adaptation has to be fast because an autonomous car or aircraft might have only a few seconds to react before a crash occurs. The neural-MPC controller can be implemented with any autonomous system, including autonomous aircraft and cars, etc.

(4) Specific Details of Various Embodiments (4.1) System Architecture

The invention for resilient control, which is referred to as the neural-Model Predictive Control (MPC) controller, permits rapid recovery or graceful failure of damaged plants. It is assumed that the plant possesses a controller with adaptable parameters that does a good job of controlling the plant under normal operating conditions. This controller is referred to as the base controller. However, once the plant is damaged and its parameters change, a controller architecture is needed that is capable of rapidly adapting to the modifications.

Figure 3:
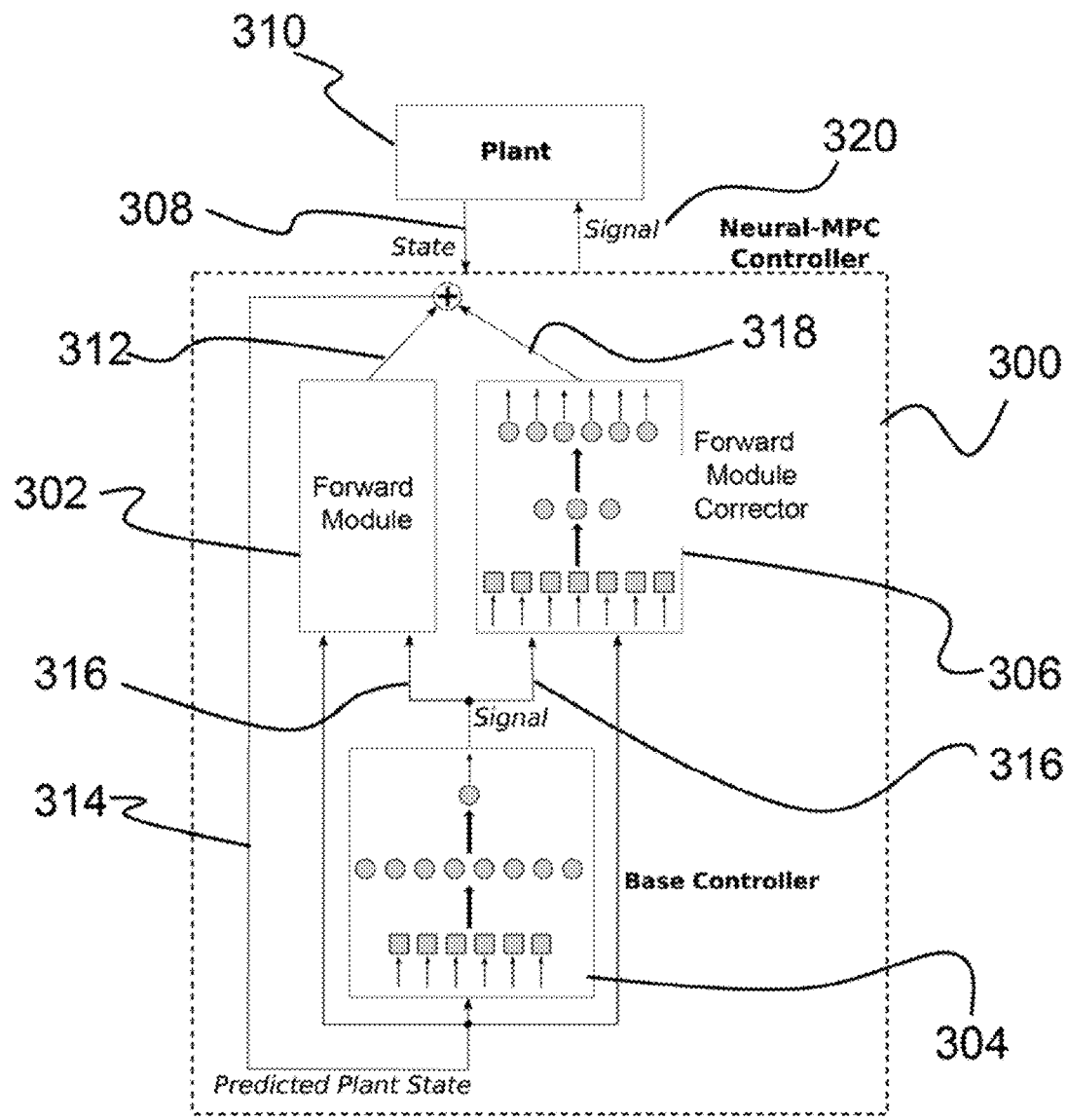
FIG. 3 is a systematic representation of a neural-Model Predictive Control (MPC) controller according to embodiments of the present invention.

FIG. 3 is a systematic representation of the neural-MPC controller 300, which includes three primary components: a static forward module 302, an adaptable base controller 304, and an adaptable forward module corrector 306. After receiving the current state 308 of the plant 310 as input, the neural-MPC controller 300 operates in a closed loop to generate a sequence consisting of pairs of control signals 316 and resulting predicted plant states 314. This process is repeated a pre-defined number of times to generate a set of signal-state sequences, each time starting with the most recently measured plant state 308 and a randomly modified base controller 304 policy.

As noted above, the architecture includes an adaptable base controller 304, a static forward module 302, and an adaptable forward module corrector 306. The base controller 304 accepts a measurement of the plant state 308 as input and generates a control signal 316 in response. The forward module 302 accepts a measurement of the plant state 308 and control signal 316 as input and produces a forward module prediction 312 of the next plant state. The forward module corrector 306 accepts the same input as the forward module (i.e., a measurement of the plant state 308 and control signal 316) and generates an additive correction 318 to the forward module output (i.e., forward module prediction 312) in response, thereby generating the predicted plant states 314. It should be understood that any suitable embodiment of the base controller 304 and forward module corrector 306 can be employed, a non-limiting example of which includes using neural networks because they permit simple, robust, and easily trained implementations.

The neural-MPC controller 300 receives a measurement of the current state 308 of the plant 310 as input, and its components (base controller 304, forward module 302, and forward module corrector 306) work together to generate a plant control signal 320 in response. Specifically, during each time-step of the control process, the base controller 304, forward module 302, and forward module corrector 306 operate in a closed loop for a predefined period of time to generate sequences that consist of pairs of control signals 316 and resulting predicted plant states 314. These sequences are used to adapt the base controller 304 and determine the plant control signal 320 generated by the neural-MPC controller 300.

When controlling an altered/damaged plant the neural-MPC controller 300 operates by first accepting as input a measurement of the current state 308 of the plant 310. This initial measurement is fed into the base controller 304, which generates a control signal 316 in response. The forward module 302 and forward module corrector 306 both accept as input the measured state 308 of the plant 310 and the control signal 316 and together generate a prediction of the next state of the plant (i.e., predicted plant states 314). At this point the neural-MPC controller 300 operates in an open loop to generate a sequence of length L of pairs of control signals 316 and corresponding predicted plant states 314. The weights of the base controller 304 are randomly modified (explained below) to create a new control policy, and a new control sequence of length L is generated, again starting from the most recently measured state 308 of the plant 310. This process is repeated until $N_s$ control sequences have been generated, where each sequence was created using a unique, randomly generated base controller 304.

The $N_s$ control sequences are then used to determine the next plant control signal 320 to apply to the plant 310, and which of the randomly generated base controllers 304 will be used next. Specifically, it is assumed that there exists a cost function defined over the space of plant states, which specifies the quality of any given state. A non-limiting example of such a cost function is the deviation of position and velocity values from their target values, e.g., for a double-pole balancing problem, the cost can be defined as $$\text{Cost}(x, \dot{x}, \theta_1, \dot{\theta}_1, \theta_2, \dot{\theta}_2) = x^2 + \dot{x}^2 + \theta_1^2 + \dot{\theta}_1^2 + \theta_2^2 + \dot{\theta}_2^2$$

where x is the cart position, x\dot the cart velocity, theta1 the angular position of pole #1, theta1\dot the angular velocity of pole #1, and the index 2 stands for the pole #2 variables.

The next plant control signal 320 is determined by finding the state that minimizes the error function among the final states in each of the $N_s$ control sequences, and then selecting the first plant control signal 320 from the minimizing sequence. Furthermore, whichever base controller 304 generated the minimizing sequence is the controller that is used on the next time-step.

(4.2) System Adaptation

Due to the alteration in the parameters of the plant 310, the original base controller 304 is no longer entirely accurate. However, typically some of the information it contains will generalize to the new plant, and thus, it is desirable to search the space of control policies implemented by the base controller 304 in such a way to use this generalizable information to quickly converge on a new effective control policy. To do so, the neural-MPC controller 300 implements a simple, but effective search strategy for modifying the weights (policy) of the base controller 304. On a given time-step, and for each of the $N_s$ sequences, each weight $w_i$ of the base controller 304 was randomly modified according to:

$$w_i \leftarrow w_i + 0.1 |w_i| N(0,1),$$

where N(0,1) is the Normal distribution with zero mean and unit variance. In this way, on each time-step of the control process, a local region of the weight-space of the base controller 304 is searched for a better control policy. The local nature of this search process helps to preserve generalizable information represented in the base controller 304, while still being flexible enough to make substantial changes to its weights if necessary.

However, it is not enough to only adapt the base controller 304. The forward module 302 must also be adapted to correct its deficiencies, otherwise the hypothetical signal-state sequences (i.e., elements 316 and 314) being generated to adapt the base controller 304 and select the next plant control signal 320 will not be sufficiently accurate.

In the neural-MPC controller 300, the parameters of the original forward module 302 are fixed; instead, the weights of a simple feed-forward network with a single hidden layer are adapted. This forward module corrector 306 network provides additive corrections to the output of the forward module 302. For example, let $v_s(t)$ be the measured state 308 of the plant 310 at time t, $F_c(t)$ the resulting control signal 316 from the base controller 304, $\vec{M}_f(\vec{s}(t), F_c(t))$ the forward module 302, and $\vec{N}_f(\vec{s}(t), F_c(t))$ the output 318 of the forward module corrector 306 network. Given $v_s(t)$ and $F_c(t)$ the forward module $\vec{M}_f$ 302 is used to compute the predicted next plant state $\vec{s}(t+\Delta t)$ 314. A non-limiting example to implement a forward module corrector is a multi-layer perceptron with one hidden layer and weighted connections between the neurons.

Let $\hat{\vec{s}}(t+\Delta t)$ be the true, observed next plant state. The forward module corrector 306 network is trained to correct the error in the forward module 302. From this requirement an error function is defined by:

$$E(t; \vec{w}) = \|\hat{\vec{s}}(t+\Delta t) - \vec{s}(t+\Delta t)\|,$$

where $\vec{w}$ are the weights of the corrector network. On each time-step the gradient of $E(t; \vec{w})$ is computed with respect to $\vec{w}$ and one step of gradient descent is applied to the weights of the forward module corrector 306 network. As the neural MPC controller 300 attempts to control the damaged plant, the forward module corrector 306 and base controller 304 simultaneously adapt to the plant's new operating parameters.

(4.3) Example Implementation—Double Pole Balancing Problem

For further understanding, described below is an example implementation as applied to the double-pole balancing problem. It should be understood that the implementation described below is for illustrative purposes only and that the invention is not intended to be limited thereto.

Figure 4:
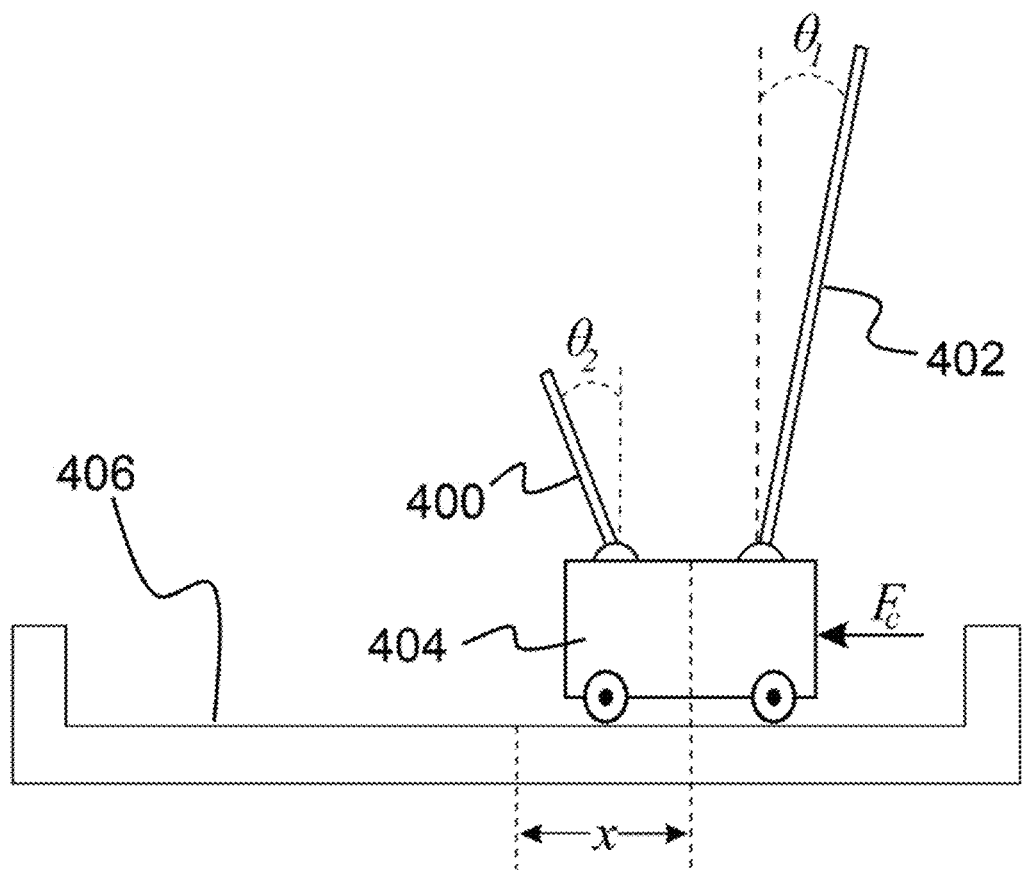
FIG. 4 is an illustration depicting a cart-pole system as used in a double-pole balancing problem.

In this example implementation, the neural-MPC controller 300 is used as a resilient controller for the double-pole balancing problem. This problem was selected because it is a challenging and widely used benchmark task in the domain of control. As shown in FIG. 4, the double-pole balancing problem is a classic benchmark control problem, particularly, for neural network controllers (see Literature Reference Nos. 13-15). The task is to balance two poles 400 and 402 with different lengths that are hinged to the top of a cart 404 that moves along a track 406 of finite length. The controller attempts to keep the poles 400 and 402 upright by applying a force to either side of the cart 404 in a direction parallel to the track 406. To be successful, the controller must keep the cart 404 within a specified distance from the center of the track 406, and it must keep each pole 400 and 402 within a specified angular limit from the vertical.

The state of the system is defined by the position x of the cart 404 relative to the center of the track 406, and the angular positions $\theta_1$ and $\theta_2$ of the large 402 and small 400 poles relative to the vertical. The control force $F_c$ is applied to the side of the cart 404, in a direction parallel to the track 406.

Figure 5:
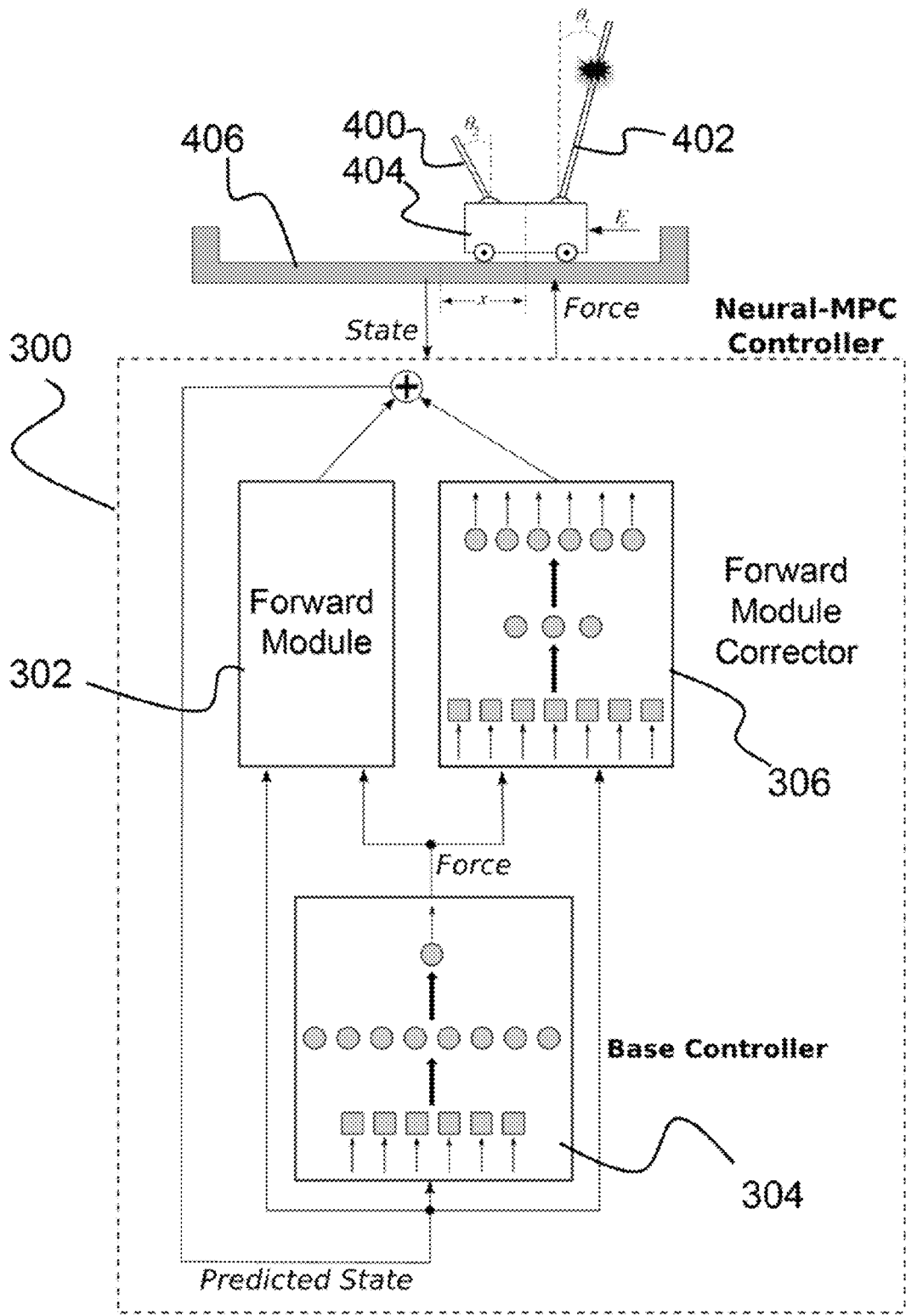
FIG. 5 is an illustration depicting the cart-pole system and the neural-MPC controller.

In this example and as shown in FIG. 5, the neural-MPC controller 300 is implemented as a simulation environment written in Java. As shown in FIGS. 5 and 6, the system of ordinary differential equations 600 governing the dynamics of the cart-pole system constitutes the forward module 302.

The base controller 304 was implemented as a feedforward neural network with 6 input nodes, 10 hidden nodes with hyperbolic tangent transfer functions, 1 output node with a hyperbolic tangent transfer function, and no bias unit. The base controller 304 was trained offline using a combination of particle swarm optimization and self-assembly known as Swarm Intelligent Network Optimization through Self-Assembly (SINOSA) (see, for example, Literature Reference No. 12).

The base controller 304 was adapted using 50 control sequences ($N_s$=50) each of length L=50. The error function used to determine the "winning" control sequence was the sum of the squares of the positions and velocities of the cart 404 and poles 400 and 402. This error function specifies the ideal state of the cart-pole system as the case in which the cart 404 is at the center of the track 406, both poles 400 and 402 are perfectly upright, and there is no movement.

The forward module corrector 306 was implemented as a feedforward neural network with 7 input nodes, 6 linear output nodes, and no bias unit. Various numbers of nodes in the hidden layer were tried, which all had hyperbolic tangent transfer functions. The forward module corrector 306 was trained using basic gradient descent with a learning rate of 0.05. At the beginning of each trial all the weights were randomly initialized to values in the interval [−1,1], and the output weights were scaled by a factor of $0.004/N_h$, where $N_h$ is the number of neurons in the hidden layer. This scaling was done to limit the initial impact of the forward module corrector 306 on the forward module 302 predictions, but the fairly large learning rate of 0.05 ensured that it could adapt quickly to correct inaccuracies in the forward module 302.

As noted above, the double pole balancing implementation is provided as a non-limiting example of a suitable implementation but the system described herein is not intended to be limited to such an implementation. For example, the system can be applied for autonomous systems or non-autonomous systems to maintain stability, such as that for a remote piloted drone or for a car being steered by a person. In the example implementation regarding the cart-pole system, the base controller was implemented by a neural network. Recall that the base controller is able to control the cart (or other system) under normal, undamaged operating conditions. However, the base controller could just as easily be a human controlling the system.

Further, the cart-pole example provides for a balancing system where the parameters being controlled are the position of the two poles based on forces applied to the cart with a limited range constraint for the cart. However, the system can be applied to operate and control any suitable parameter, such as maintaining lift and/or orientation for a flying drone that sustains damage, or maintaining vehicle orientation through ABS control for maintaining straight line travel or while going around a curve. The system is devised to extend to those physical systems. In those cases one would have a base controller that was designed for controlling those particular systems under normal or standard operating conditions, and the system would apply once the system had sustained damage or undergone some type of unintended modification. Thus, the plant could be, for example, wheeled or tracked vehicles, drones with one or more rotors and/or wings, etc. The plant can also be any item where position or movement can be controlled in a machine, such as in manufacturing equipment, or legged movement. Such controllable plant parameters include one or more of linear or angular position (e.g., through actuators) or velocity (e.g., through controlling a motor or propulsion means), or path of travel (e.g., through controller a motor (propulsion) and steering or direction controls).

(4.3.1) Experimental Results

Provided below are the results of the experiments that were run to test the neural-MPC controller. All of the following experiments started with the same base controller, which was trained to control the cart-pole system when its parameters were set to the most commonly used values (see Literature Reference No. 14 for example of cart-pole system parameter values). As in most past work, the equations governing the dynamics of the system were solved numerically using a fourth-order Runge-Kutta method with a step-size of 0.01 seconds. Consequently, the original forward module was integrated using the same method. During a simulation, the state of the cart-pole system was given to the controller every 0.02 seconds, at which point the control force was updated.

The base controller was able to keep the undamaged cart-pole system close to the equilibrium state. To simulate sudden damage, the length and mass of the large pole was reduced, and the state of the cart-pole system was perturbed away from the equilibrium state in which both poles are upright, the cart is at the center of the track, and there is no movement. The ability of the neural-MPC controllers to control the cart-pole system were tested at six different levels of damage: 25%, 30%, 35%, 40%, 45%, and 50% reductions in the length and mass of the large pole. The initial state of the cart-pole system was drawn randomly and independently from the uniform probability distributions $x,\theta_1,\theta_2 \in U[-0.01,0.01]$ and $\dot{x},\dot{\theta}_1,\dot{\theta}_2 \in U[-0.1,0.1]$. Here, x is the position of the cart, $\theta_1$ and $\theta_2$ are the positions of the poles, and $\dot{x},\dot{\theta}_1,\dot{\theta}_2$, are the respective velocities. The greater the reduction in the length of the large pole, the more difficult it was to recover from the damage. It was determined that at damage levels less than 25%, the original base controller was capable of preventing the system from failing, albeit the deviations from the equilibrium state were larger.

Figure 7:
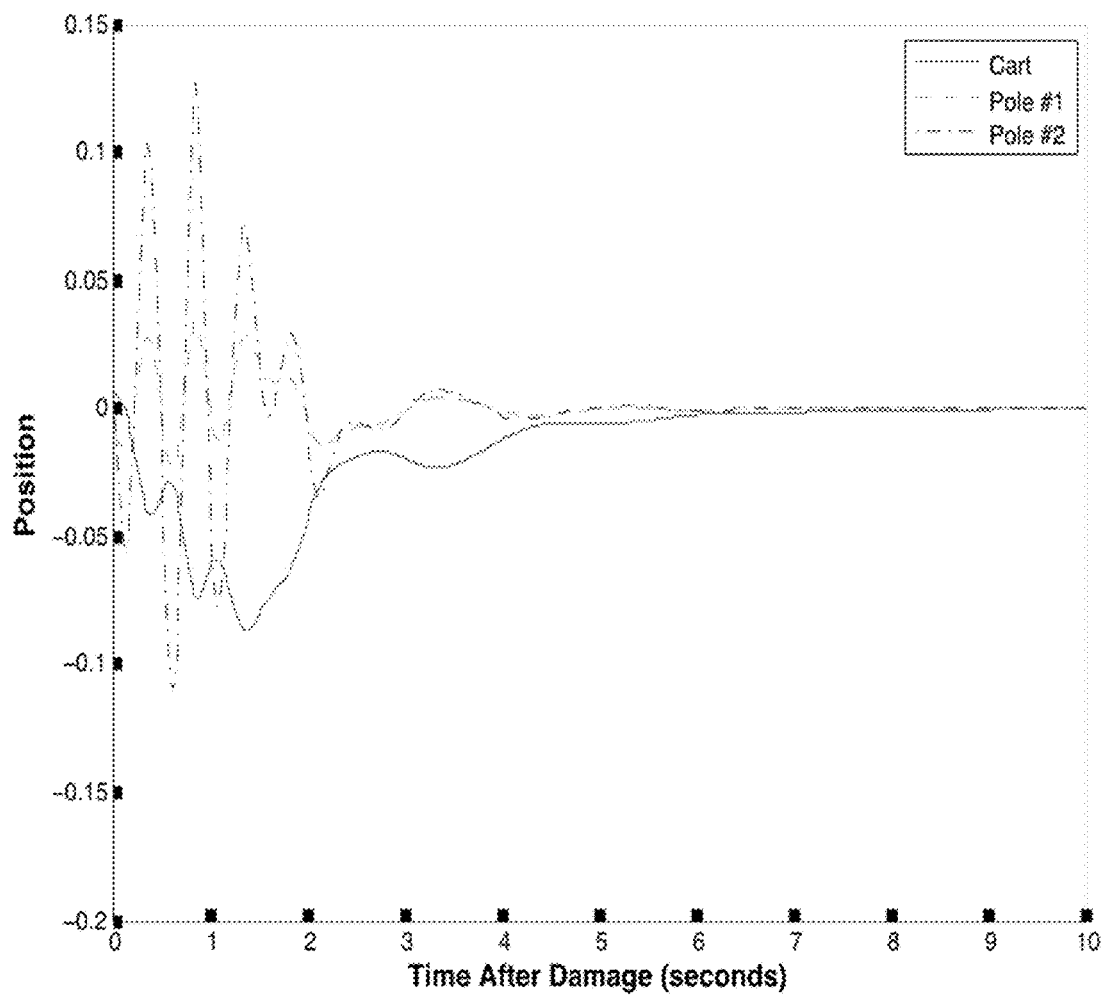
FIG. 7 is a graph illustrating positions of the cart and poles after damage to the cart-pole system.
Figure 8:
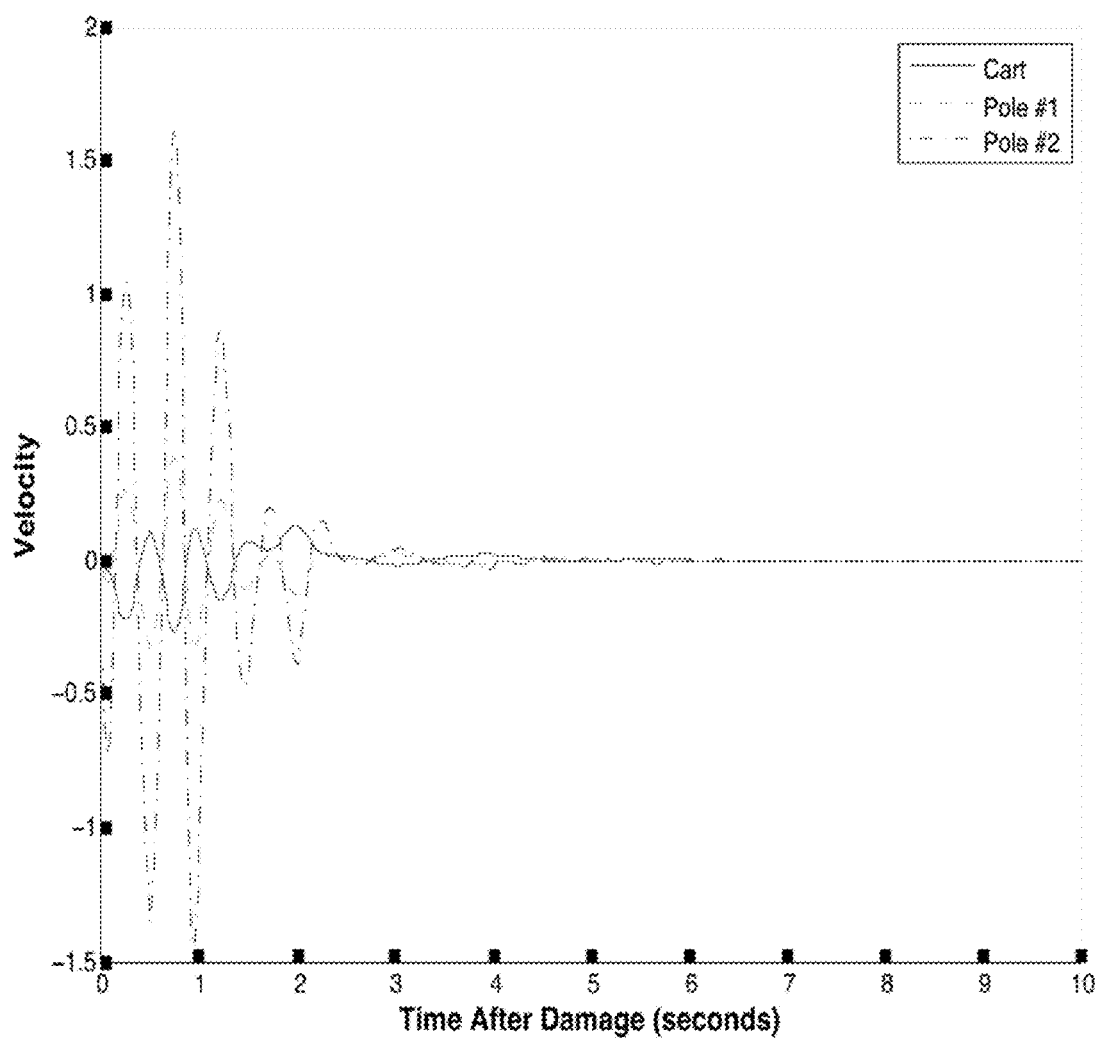
FIG. 8 is a graph illustrating velocities of the cart and poles after damage to the cart-pole system.
Figure 9:
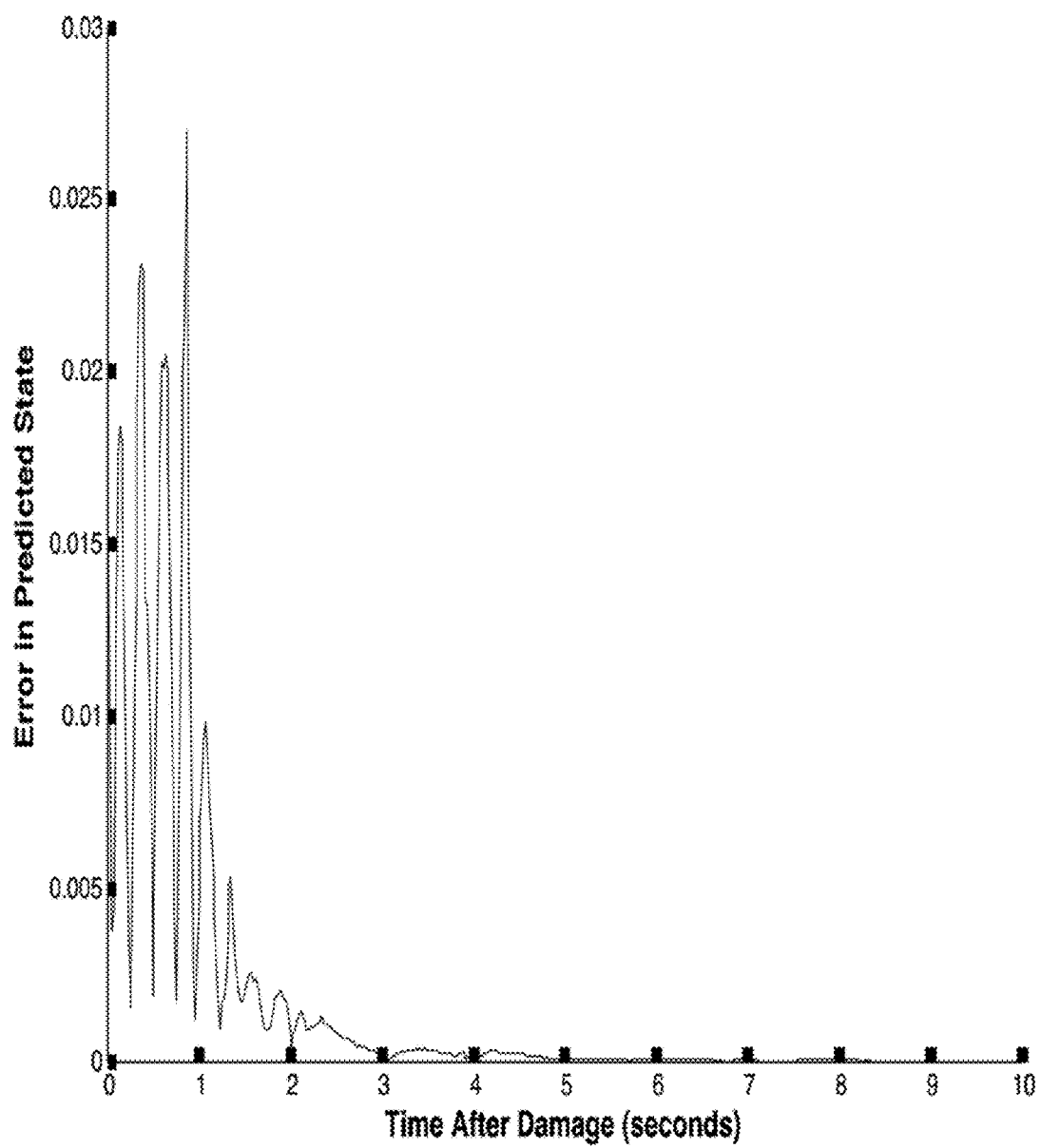
FIG. 9 is a graph illustrating error in the predictions of the cart-pole system state made by the neural-MPC controller after damage to the cart-pole system.

FIGS. 7 through 9 depict an example results of a neural-MPC controller that uses a forward module corrector network with 3 hidden neurons regaining control of the cart-pole system after 30% damage. FIG. 7 shows the positions of the cart and poles after damage had occurred. After an initial transient period the neural-MPC controller learned enough about the new behavior of the damaged system and was able to center the cart and poles. The cart position is in meters, and the pole positions are in radians. Alternatively, FIG. 8 shows the velocities of the cart and poles after damage had occurred. Again, after an initial transient period the neural-MPC controller learned enough about the new behavior of the damaged system and was able to stabilize its dynamics. The cart velocity is in m/s and the pole velocities are in rad/s.

FIG. 9 shows the error in the state of the cart-pole system that was predicted by the neural-MPC controller. The forward module corrector network quickly learned to correct the inaccuracies in the forward module, thereby allowing the neural-MPC controller to regain control of the system. The error is defined to be the norm of the difference between the next state predicted by the neural-MPC controller and the actual state observed at the next time. In FIGS. 7 and 8, the positions and velocities of the cart and poles can be seen to vary substantially during the first two seconds after damage has occurred, but they quickly converged towards zero as the neural-MPC controller adapted to the changes in the system. This adaptation is reflected in FIG. 9 where the error exhibited large excursions from zero during the first second after damage had occurred, but this error quickly converged to zero as the forward module corrector network learned to correct the inaccuracies in the forward module.

For each level of damage, forward module corrector networks were tested with 1, 2, 3, 4, 5, 10, 15, 20, 30, and 40 hidden neurons. For every level of damage and each corrector network size, 200 trials were run where every trial started with a different randomly select initial state of the cart-pole system and a unique seed for the random number generator. Each trial was run until the cart-pole system failed or 3000 time-steps were taken, which is equivalent to 3000*0.02s=1 minute of simulated time.

Figure 10:
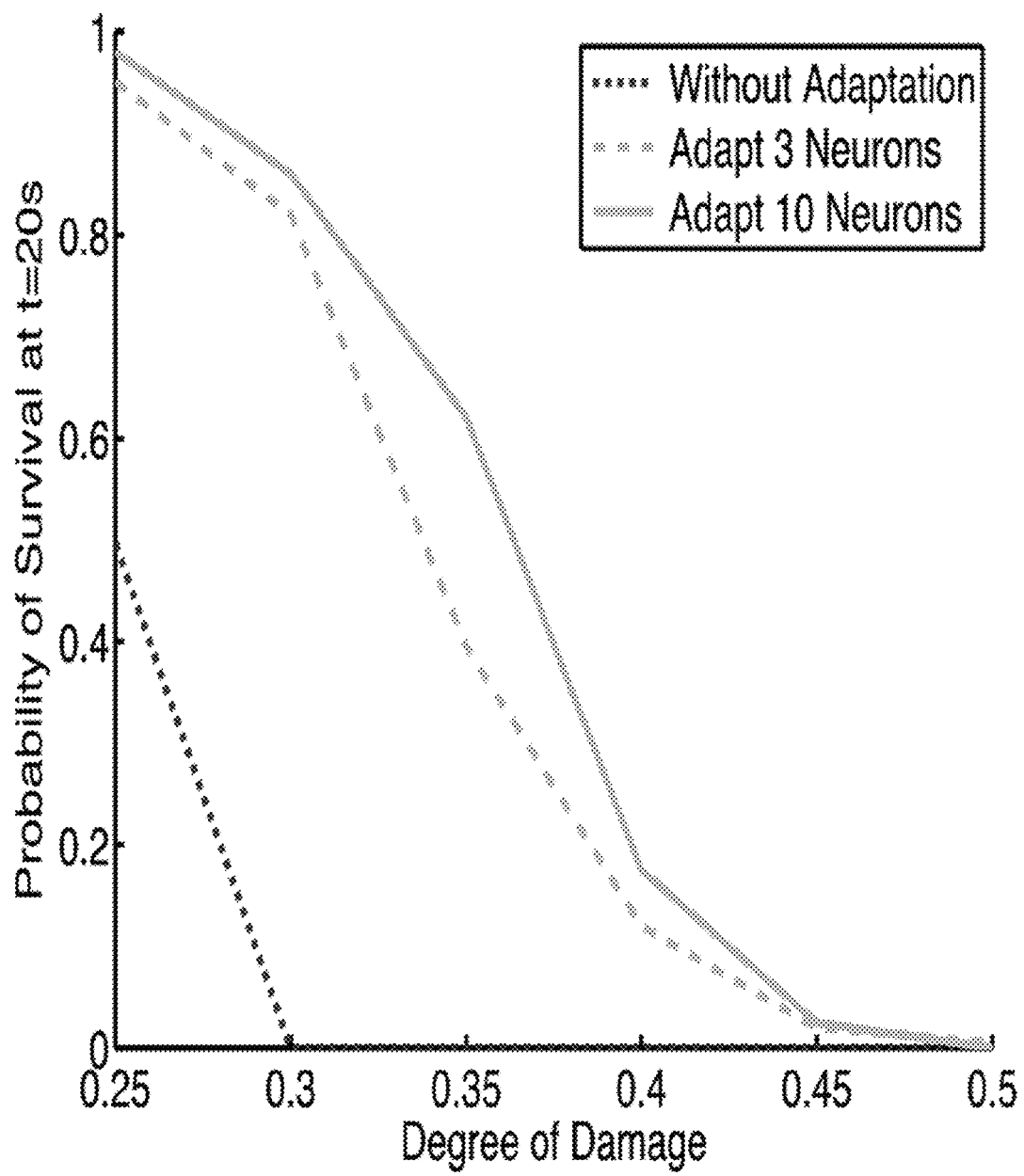
FIG. 10 is a graph illustrating probabilities of the cart-pole system being successfully controlled for at least 20 seconds after various levels of damage have occurred.
Figure 11:
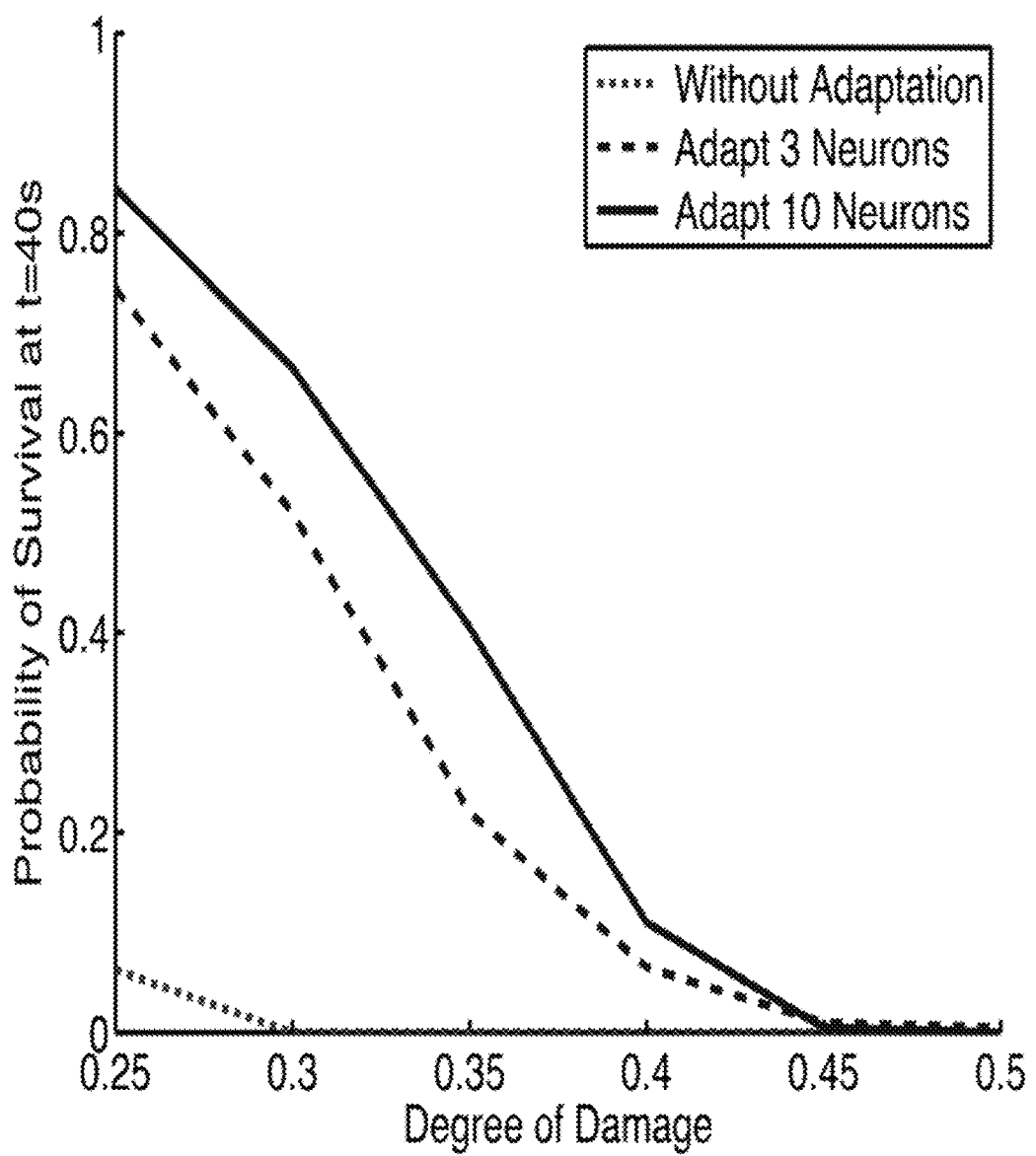
FIG. 11 is a graph illustrating probabilities of the cart-pole system being successfully controlled for at least 40 seconds after various levels of damage have occurred.
Figure 12:
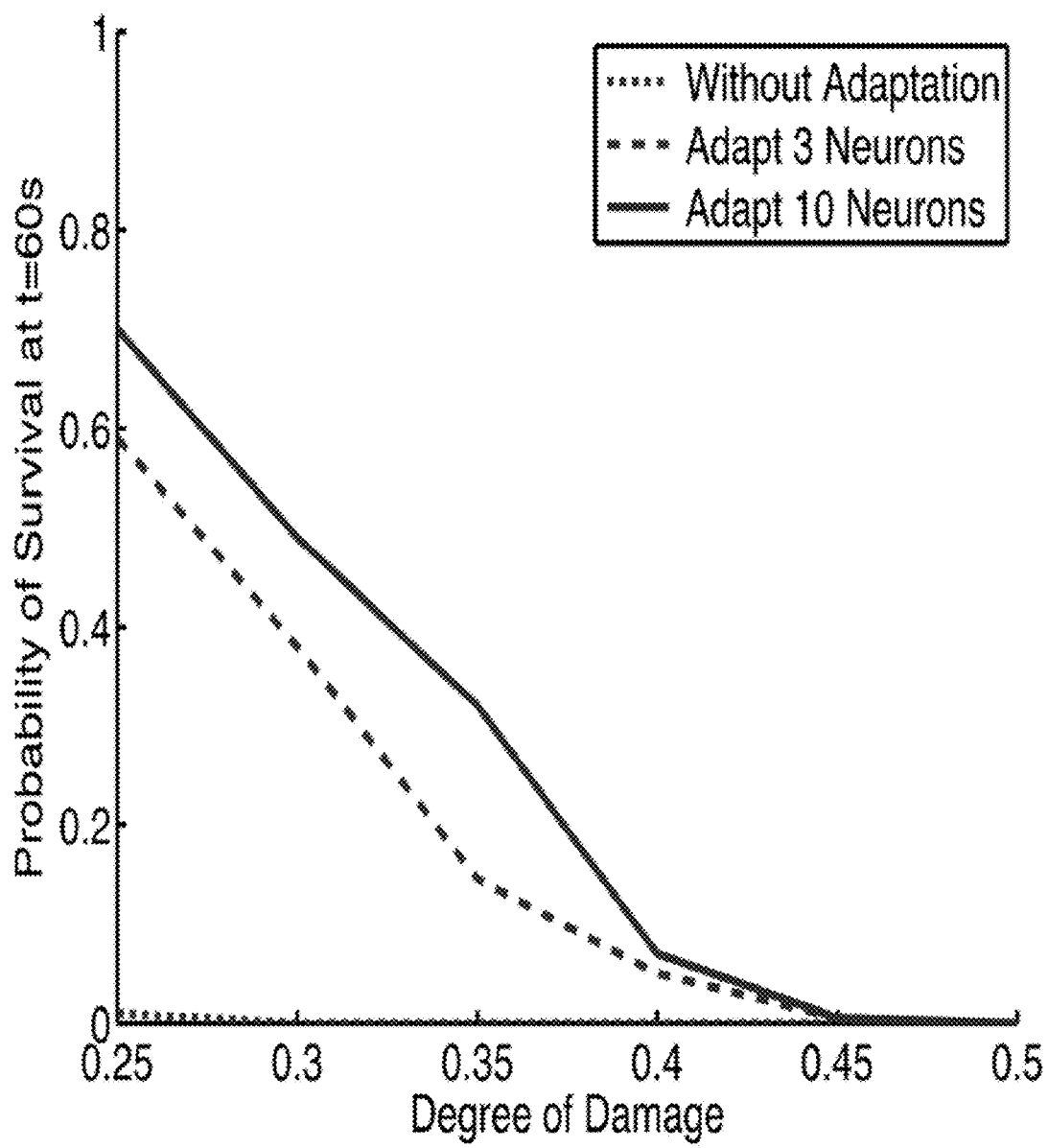
FIG. 12 is a graph illustrating probabilities of the cart-pole system being successfully controlled for at least 60 seconds after various levels of damage have occurred.

FIG. 10, for example, shows the probability of the cart-pole system remaining in the success domain after 20s for various levels of damage when using either the neural-MPC controller with 3 or 10 hidden neurons in the forward module corrector network or just the base controller without forward-model adaptation. FIGS. 11 and 12 show the same statistics for the cases of 40s and 60s survival times, respectively. In all three cases, the neural-MPC controllers substantially outperformed the original base controller. Even at the lowest levels of damage, the cart-pole system failed fairly quickly when under the control of the original base controller. In contrast, the neural-MPC controllers were often capable of completely regaining control of the system at lower levels of damage and exhibited much longer survival times at higher levels of damage. Furthermore, both the 3 and 10 hidden-neuron cases did well, indicating that it is possible to use relatively small networks when we exploit the a priori given functional relationship in the original forward module.

Figure 13:
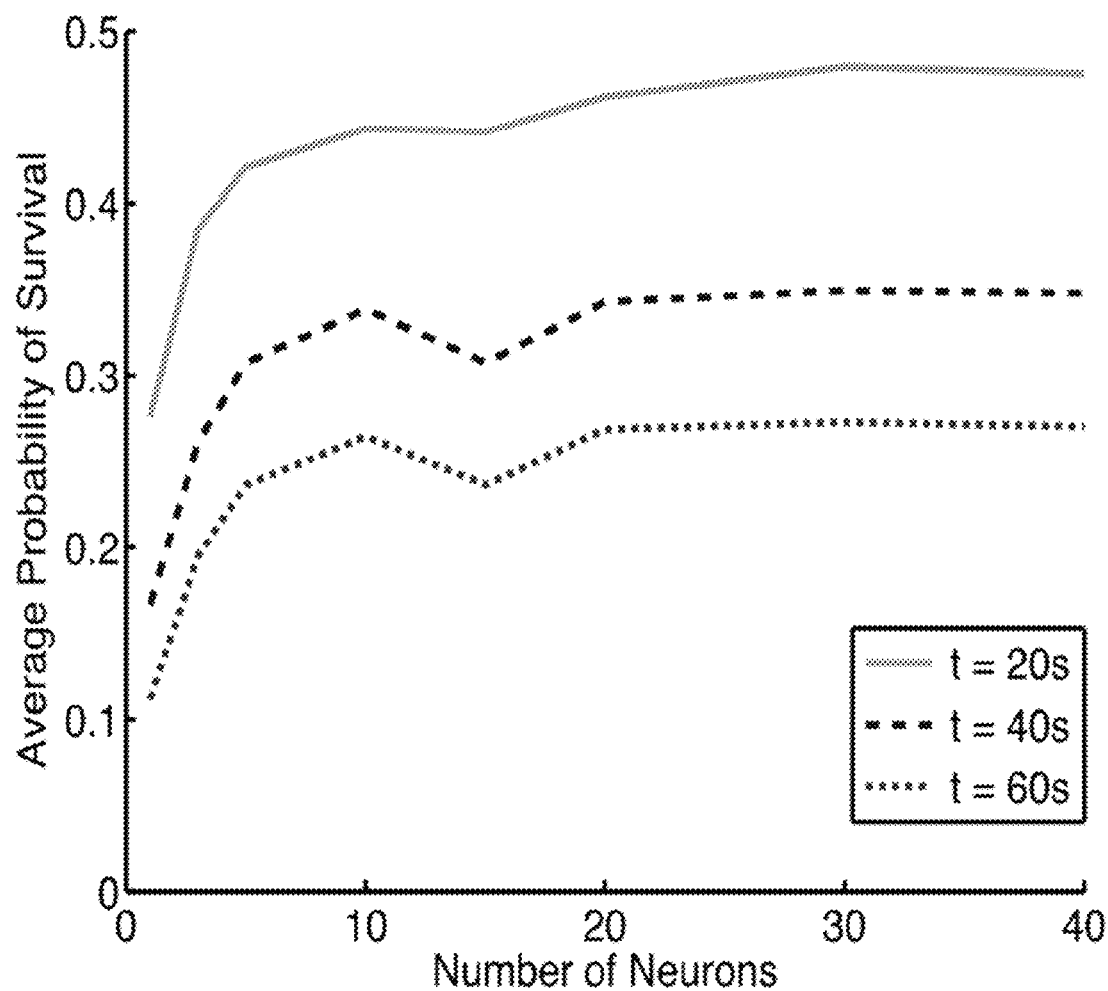
FIG. 13 is a graph illustrating the average probability of survival for a range of different forward module corrector network sizes for survival times of 20s, 40s, and 60s.

The performances of the neural-MPC controllers were compared when different numbers of hidden neurons were used in the forward module corrector network. FIG. 13, for example, shows the average probability of survival for a range of different corrector network sizes for survival times of 20s, 40s, and 60s. For a given corrector network size and survival time, the average was taken over all six levels of damage. Controllers with larger corrector networks tended perform better on average. However, the improvements began to asymptote around 10 hidden neurons and good results were obtained with as few as 2 or 3 hidden neurons.

Thus, given the results above, it is clear that the neural MPC controller is effective in quickly adapting a base controller of a dynamical system to an unexpected change in dynamics.

What is claimed is:

1. A neural-Model Predictive Control (MPC) controller, comprising:
    one or more non-transitory electronic processors, the non-transitory electronic processors configured to perform operations of:
    receiving, in a forward module, a measurement of a current state of a plant and a control signal from a base controller to generate a forward module prediction;
    receiving, in a forward module corrector, the measurement of the current state of the plant and the control signal to generate an additive correction to the forward module prediction to generate a predicted plant state;
    generating control sequences of pairs of control signals and corresponding predicted plant states; and
    generating a next plant control signal based on the control sequences.

2. The neural-Model Predictive Control (MPC) controller as set forth in claim 1, further configured to perform operations of receiving, in the base controller, the measurement of a current state of a plant and generating the control signal based on the measurement of the current state of the plant.

3. The neural-Model Predictive Control (MPC) controller as set forth in claim 2, wherein a cost function is defined over predicted plant states, such that the next control plant signal is determined by finding a predicted plant state that minimizes the cost function among the predicted plant states in each of the, V control sequences to generate a minimizing sequence, and then selecting a first plant control signal from the minimizing sequence.

4. The neural-Model Predictive Control (MPC) controller as set forth in claim 3, wherein the base controller that generates the minimizing sequence is the base controller that is used on a next time-step.

5. The neural-Model Predictive Control (MPC) controller as set forth in claim 1, further comprising one more sensors communicatively connected with base controller, forward module, and forward module corrector to generate the measurement of the current state of the plant.

6. The neural-Model Predictive Control (MPC) controller as set forth in claim 1, wherein each control sequence is generated using a unique randomly generated base controller.

7. The neural-Model Predictive Control (MPC) controller as set forth in claim 1 wherein the forward module corrector is a neural network.

8. The neural-Model Predictive Control (MPC) controller as set forth in claim 1, wherein the forward module corrector is a multi-layer perceptron.

9. The neural-Model Predictive Control (MPC) controller as set forth in claim wherein the base controller is a neural network.

10. The neural-Model Predictive Control (MPC) controller as set forth in claim 1, further comprising one more sensors communicatively connected with base controller, forward module, and forward module corrector to generate the measurement of the current state of the plant;
    wherein each control sequence is generated using a unique randomly generated base controller;
    wherein a cost function is defined over predicted plant states, such that the next control plant signal is determined by finding a predicted plant state that minimizes the cost function among the predicted plant states in each of the Ns control sequences to generate a minimizing sequence, and then selecting a first plant control signal from the minimizing sequence;
    wherein the base controller that generates the minimizing sequence is the base controller that is used on a next time-step;
    wherein the forward module corrector is a neural network; and
    wherein the forward module corrector is a multi-layer perceptron.

11. A method for fast adaptation from sparse data using a neural-Model Predictive Control (MPC) controller, method comprising:
    an act of causing one or more processors to execute instructions stored on a non-transitory memory such that upon execution, the one or more processors perform operations of:
    receiving, in a forward module, a measurement of a current state of a plant and a control signal from a base controller to generate a forward module prediction;
    receiving, in a forward module corrector, the measurement of the current state of the plant and the control signal to generate an additive correction to the forward module prediction to generate a predicted plant state;

generating control sequences of pairs of control signals and corresponding predicted plant states; and generating a next plant control signal based on the control sequences.

12. The method as set forth in claim 11, further comprising an act of performing operations of receiving, in the base controller, the measurement of a current state of a plant and generating the control signal based on the measurement of the current state of the plant.

13. The method as set forth in claim 12, wherein a cost function is defined over predicted plant states, such that the next control plant signal is determined by finding a predicted plant state that minimizes the cost function among the predicted plant states in each of the Ns control sequences to generate a minimizing sequence, and then selecting a first plant control signal from the minimizing sequence.

14. The method as set forth in claim 13, wherein the base controller that generates the minimizing sequence is the base controller that is used on a next time-step.

15. The method as set forth in claim 11 further comprising an act receiving a signal om of one more sensors communicatively connected with base controller, forward module, and forward module corrector to generate the measurement of the current state of the plant.

16. The method as set forth in claim 11, wherein each control sequence is generated using a unique randomly generated base controller.

17. The method as set forth in claim 11, wherein the forward module corrector is a neural network.

18. The method as set forth in claim 11, wherein the forward module corrector is a multi-layer perceptron.

19. The method as set forth in claim 11, wherein the base controller is a neural network.

20. The method as set forth in claim 11, further comprising an act receiving a signal from of one more sensors communicatively connected with base controller, forward module, and forward module corrector to generate the measurement of the current state of the plant;
wherein each control sequence is generated using a unique randomly generated base controller;
wherein a cost function is defined over predicted plant states, such that the next control plant signal is determined by finding a predicted plant state that minimizes the cost function among the predicted plant states in each of the Ns control sequences to generate a minimizing sequence, and then selecting a first plant control signal from the minimizing sequence;
wherein the base controller that generates the minimizing sequence is the base controller that is used on a next time-step;
wherein the forward module corrector is a neural network; and
wherein the forward module corrector is a multi-layer perceptron.

21. A computer program product for fast adaptation from sparse data using a neural-Model Predictive Control (MPC) controller, the computer program product comprising computer-readable instructions stored on a non-transitory computer-readable medium that are executable by a computer having one or more processor for causing the processor to perform operations of:

receiving, in a forward module, a measurement of a current state of a plant and a control signal from a base controller to generate a forward module prediction;

receiving, in a forward module corrector, the measurement of the current state of the plant and the control signal to generate an additive correction to the forward module prediction to generate a predicted plant state;

generating control sequences of pairs of control signals and corresponding predicted plant states; and generating a next plant control signal based on the control sequences.

22. The computer program product as set forth in claim 21, further comprising instructions for causing the one or more processors to perform operations of receiving, in the base controller, the measurement of a current state of a plant and generating the control signal based on the measurement of the current state of the plant.

23. The computer program product as set forth in claim 22, wherein a cost function is defined over predicted plant states, such that the next control plant signal is determined by finding a predicted plant state that minimizes the cost function 30 among the predicted plant states in each of the Ns control sequences to generate a minimizing sequence, and then selecting a first plant control signal from the minimizing sequence.

24. The computer program product as set forth in claim 23, wherein the base controller that generates the minimizing sequence is the base controller that is used on a next time-step.

25. The computer program product as set forth in claim 21, further comprising instruction means for causing the one or more processors to receive a signal from of one more sensors communicatively connected with base controller, forward module, and forward module corrector to generate the measurement of the current state of the plant.

26. The computer program product as set forth in claim 21, wherein each control sequence is generated using a unique randomly generated base controller.

27. The computer program product as set forth in claim 21, wherein the forward module corrector is a neural network.

28. The computer program product as set forth in claim 21, wherein the forward module corrector is a multi-layer perceptron.

29. The computer program product as set forth in claim 21, wherein the base controller is a neural network.

30. The computer program product as set forth in claim 21, further comprising instruction means for causing the one or more processors to receive a signal from of one more sensors communicatively connected with base controller, forward module, and forward module corrector to generate the measurement of the current state of the plant;

wherein each control sequence is generated using a unique randomly generated base controller;

wherein a cost function is defined over predicted plant states, such that the next control plant signal is determined by finding a predicted plant state that minimizes the cost function among the predicted plant states in each of the Ns control sequences to generate a minimizing sequence, and then selecting a first plant control signal from the minimizing sequence;

wherein the base controller that generates the minimizing sequence is the base controller that is used on a next tine-step;

wherein the forward module corrector is a neural network; and wherein the forward module corrector is a multi-layer perceptron.

* * * * *